United States Patent [19]
Wier

[11] Patent Number: 4,468,015
[45] Date of Patent: Aug. 28, 1984

[54] WIRE TENSIONING APPARATUS
[76] Inventor: Jan H. Wier, Burleigh, Bulls, New Zealand
[21] Appl. No.: 377,428
[22] Filed: May 12, 1982
[30] Foreign Application Priority Data May 14, 1981 [NZ] New Zealand .................. 197099

[51] Int. Cl.$^3$ ............................................. F16F 1/00
[52] U.S. Cl. ...................... 267/71; 267/158;
267/160; 24/129 A; 24/131 R; 256/37; 256/10;
174/40 TD; 248/303
[58] Field of Search .......... 24/201 TR, 115 A, 129 A,
24/131 R, 129 C, 115 F, 261 R; 256/37, 39, 10;
174/40 TD, 45 TD; 267/69, 71, 158, 160, 164,
47, 44; D8/370, 394, 395; 248/303; 220/91, 92

[56] References Cited
U.S. PATENT DOCUMENTS

| | | | |
|---|---|---|---|
| D. 35,370 | 12/1901 | Greiner | D8/394 |
| 126,417 | 5/1872 | Sellers et al. | 256/37 |
| 252,702 | 1/1882 | Ruane | 256/39 |
| 387,182 | 7/1888 | Reilley | 220/91 |
| 519,617 | 5/1894 | Power | 267/69 |
| 2,948,360 | 8/1960 | Lupton | 267/158 |
| 3,684,248 | 8/1972 | Maes, Jr. | 256/39 |
| 4,040,604 | 8/1977 | Langlie et al. | 174/40 |

Primary Examiner—Francis S. Husar
Assistant Examiner—Linda McLaughlin
Attorney, Agent, or Firm—Holman & Stern

[57] ABSTRACT

The invention provides a wire tensioning member for providing spring tension in a fence wire. There is provided a spring steel member of a resiliently deformable compound curvature, with the wire being attachable to one end, and the other end being provided with an engaging portion or shaft engageable in a recess provided on a fence post or other fixed ground anchor. The particular application is to provide resilience in light gauge (i.e. between 12-22 gauge) high tensile wire used in electric fencing systems. The resilience of the wire tensioning member also enables it to be used as a conventional gate handle, and furthermore enables the fence to be tensioned to provide overhead or pinned gates in any desired part of the fence for animals or vehicles to pass therethrough.

4 Claims, 5 Drawing Figures

WIRE TENSIONING APPARATUS

BACKGROUND OF THE INVENTION

1. Field of the Invention

This invention concerns improvements in and relating to wire tensioning apparatus, and more particularly concerns an improved fence member at least capable of providing a spring tension in a fence wire.

2. Description of the Prior Art

It has been known to provide a variety of different types of wire straining apparatus for the providing of tension, or more particularly, strain in a fence wire. However, the types of wire strainers which have been known in the art have been generally used in relation to the providing of strain in heavy gauge fence wire, for example No. 8 type fence wire, which is used in conventional multiwire, batten and post type permanent fences. However, through the use of electrified fencing techniques, it has been found possible to use lighter gauge wire in the construction of permanent fences. It is not necessary, or possible, to exert as high a strain on such lighter gauge fencing wire, for example, where No. 16 gauge wire is used, and it has been found that manual straining of this type of wire is sufficient to properly tension the fence.

However, it has also been found that lighter gauge fence wire when used as a permanent fence is more susceptible to breakage when additional tension is applied to the fence, such as for example when the fence is charged by an animal. Thus, it is considered that it would be advantageous to provide an apparatus which would assist in the manual tensioning of lighter gauge fence wire for permanent fence applications, and which additionally provide for some resilience in the wire to overcome the problems which have previously been experienced in the art.

BRIEF SUMMARY OF THE INVENTION

It is accordingly an object of this invention to provide an apparatus capable of providing a spring tension in a fencing wire, and which provides other advantages for uses particularly in relation to electrified type fencing which will become apparent from the following description. It is also an object of this invention to provide the public with a useful choice.

According to this invention there is provided a wire tensioning member for providing a spring tension in a fence wire including a spring steel member of a resiliently deformable compound curvature including a curved body portion, and a first end portion of a lesser radius of curvature with a wire receiving aperture or recess and a wire receiving portion about which the wire may be wound adjacent the end of said first end portion, and a second end portion including an engaging portion, and an insulating handle provided on said tensioning member.

According to a further aspect of this invention there is provided a wire tensioning member as described in the preceding paragraph wherein the engaging portion of the second end member is preferably an inwardly depending elongate engaging portion.

According to a further embodiment of this invention there is provided a wire tensioning member as described in the preceding two paragraphs, in combination with an insulated plastics plug member, which plug member is engageable with a fixed support member, and includes a recess adapted to receive the elongate engaging portion of the wire tensioning member, and a peripheral flange about said recess.

Further according to this invention there is provided a method of tensioning a light gauge fence wire including the providing of a wire tensioning member of a resiliently deformable compound curvature including a curved body portion, a wire receiving first end portion, and an elongate engaging portion on its other end, including: passing the free end of the wire through an aperture or recess in said first end portion, winding the wire about a wire receiving portion to adjust the length of the wire for the desired tension, and engaging a removably engageable engaging means in a fixed support member.

BRIEF DESCRIPTION OF THE DRAWINGS

Other objects and advantages of this invention will become apparent from the following description which is provided by way of example only, and with reference to the accompanying drawings wherein.

DETAILED DESCRIPTION

Figure 1:
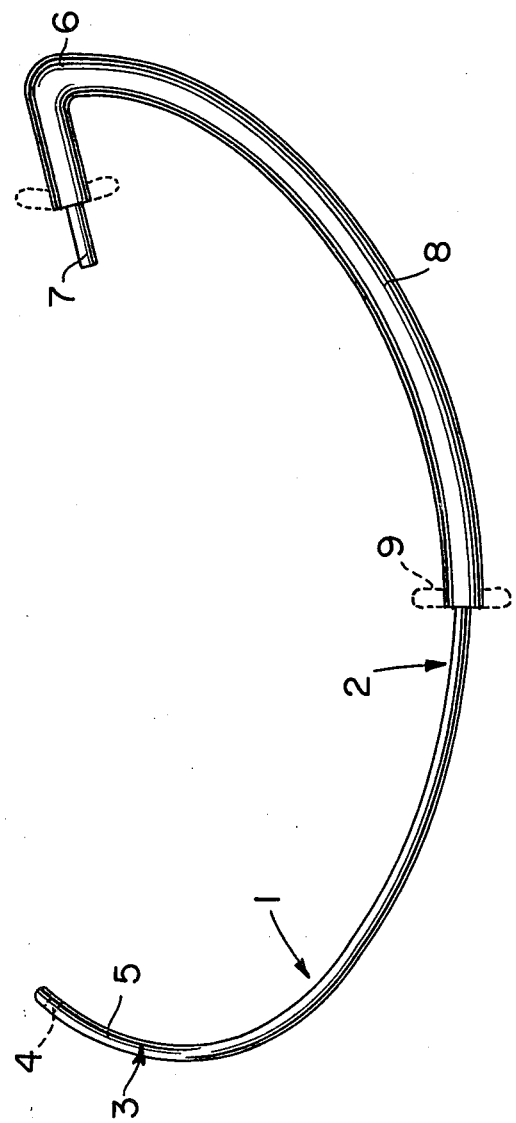
FIG. 1 is a plane view of the wire tensioning member according to the preferred embodiment of the invention in its "natural" position.

The invention principally comprises a wire tensioning member which is adapted to provide a spring tension in a fence wire. The wire tensioning member according to the invention is of a compound curve shape which is resiliently deformable so as to provide a spring tension in a fence wire and prevent damage to or breakage of the wire when it is subject to any excessive load. The types of excessive load include those exerted by animals charging the fence, or intentional loads where the fence is lowered/raised for animals to pass therethrough (as will be described). The wire tensioning member of the invention furthermore provides a convenient apparatus for the adjustment of length of and the straining of the fence wire before tensioning the fence. In particular, the fence wire may be roughly adjusted for length and then may be engaged with or wrapped around the first end of the wire tensioning member of the invention. The curve in the wire tensioning member provides a convenient handle by which the fence wire may be manually pulled or strained and more finally adjusted for length before the wire tensioning member is connected to a fence post in the manner to be described.

The shape of the apparatus in the preferred embodiment of the invention also provides that the handle as described may be properly insulated and may thus be capable of use in electric fence type applications. In particular, since the wire tensioning member is removably engageable from a fence post, it will be readily appreciated that the wire tensioning member can be used to facilitate the opening and closing of that particular end of the fence to provide a gate means.

Now, with particular reference to the preferred embodiment of the invention as shown in the drawings, there is disclosed a wire tensioning member which in the preferred embodiment of the invention includes a spring steel member which may preferably be a spring steel rod or bar which is thereby resiliently deformable from the curved shape into which it is formed and provided in its "natural" position (as shown).

The wire tensioning member 1 is a resiliently deformable compound curve 2 which is capable under excessive load of being tensioned until it is almost flattened out, so that it will be appreciated that the apparatus of the preferred form of the invention provides for a considerable spring tension in any reasonable length of fencing wire as would be used in agricultural applications.

The invention furthermore provides in its preferred embodiment for a first end 3 of the wire tensioning member to be adapted to receive a fence wire 10. In preferred embodiments of the invention an aperture or recess 4 of a suitable diameter to receive a fence wire therethrough/therein is provided adjacent this first end 3 of the fence member. The fence wire is then passed therethrough and the wire tensioning member is rotated so that the wire is wound onto the wire receiving portion 5 of the first end portion 3.

The second end portion 6 in the preferred embodiment of the invention is curved inwardly to provide an engaging portion which is adapted to be positioned in a fence post. In the preferred embodiment of the invention the engaging portion 7 is comprised as an inwardly depending elongate end portion which is adapted in its preferred embodiment to be received in a hole 21 provided in a fence post 20. In the preferred embodiment of the invention the hole 21 may be suitably insulated by for example the positioning of a plug 22 into at least one end of the hole, or possibly into each end of the hole where the hole is drilled through the posts. The insulated plug member includes a peripheral flange 22(a) and may be provided in any suitable materials such as for example, plastics, teflon, or other suitable materials. It will also be appreciated that where the sleeve member 22 is provided in the hole, the elongate engaging portion 7 of the wire tensioning member will be capable of partial rotation in the hole. The plug member will also facilitate the convenient connection and removal of the wire tensioning member from the fence post.

It is of course to be appreciated that other embodiments of engaging members may be provided on the second end 6 of the fence member, by which the wire tensioning member can be suitably connected to a fence post, or some other suitable fixed point.

It will be appreciated that the curved shape of the wire tensioning member in the preferred embodiment wire tensioning member in the preferred embodiment provides for a convenient handle with a manual adjustment of the length of and the straining of the wire prior to the engagement of the wire tensioning member into the fence post. Further, in preferred embodiments of the invention, the curved portion 2 of the wire tensioning member is provided with an insulated handle 8 which in the preferred embodiment can be insulated plastic pipe or a safety type insulated handle with embossed type portions 9 on each end thereof. The handle prevents the user of the wire tensioning means from coming into engagement with the electrified portion of the spring steel member during use of the apparatus in electric fence applications.

Figure 2:
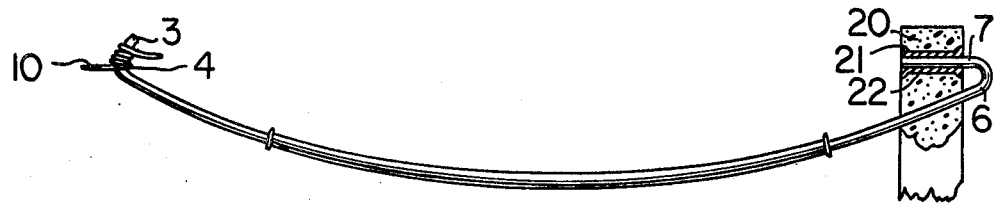
FIG. 2 is a view of the wire tensioning member according to FIG. 1 of the invention in use providing spring tension to a fence wire.

Now, with particular reference to FIG. 2 of the drawings, there is disclosed a schematic representation of the apparatus in use. In particular, the wire has been adjusted for length, and manually strained, with tension then being applied to the wire tensioning member to enable it to be positioned in the hole provided in the adjacent fence post. Thus, it will be appreciated that the drawing in FIG. 2 shows the wire tensioning member of the invention in its tensioned position, although it will be appreciated that this tensioning may be very much increased during excessive load so that the curved shape may be resiliently deformed to such an extent that the curve is "flattened out" to a considerably greater extent as shown in FIG. 2 of the drawings.

One of the particular advantages of the wire tensioning member of the present invention is that it provides an insulated handle adjacent one end of the fence, and furthermore provides that this particular end of the fence is removably engageable from the fence post. Therefore, it will be appreciated that the invention provides for a very convenient gate particularly in electrical fencing applications. To this end, it is considered that it may be advantageous to provide a secondary post adjacent the fence to which the wire tensioning member of the invention may be temporarily engaged so as to provide an opening through which animals, or farm vehicles or the like may pass. It will be appreciated that this provides a very convenient and efficient gate which is considerably less expensive to provide than a conventional wooden framed gate.

Figure 3:
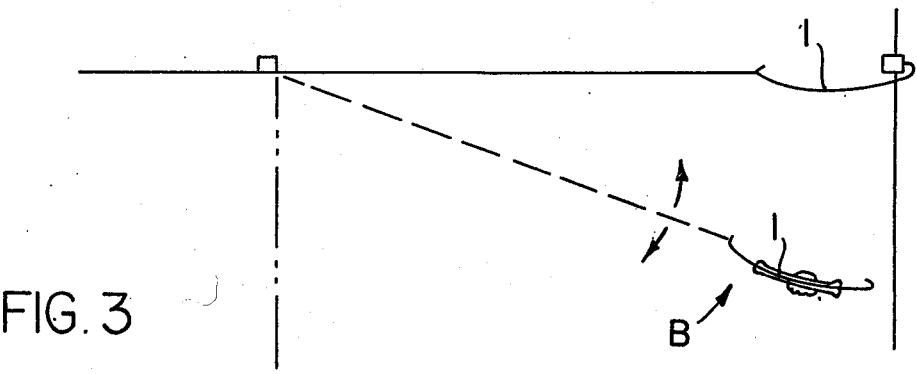
FIG. 3 is a diagrammatic representation of one possible use of the wire tensioning member according to the present invention.

Further, it will be appreciated that the wire tensioning member of this invention has particular advantages for use as a gate since it can be conveniently used as a handle for quickly providing an opening, or closing an electrified fence so as to enable animals to be readily drafted through the narrow type gate which may be provided in this embodiment of the invention. In the first arrangement of the gate, secondary post 40 is used as disclosed and referred to by arrow A in FIG. 3 of the drawings, with the second arrangment where the wire tensioning member is held by the operator being disclosed with reference to arrow B in the same drawing.

Figure 4A:
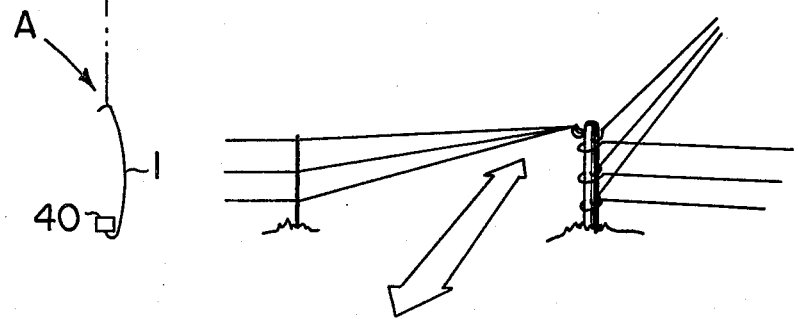
FIGS. 4A and 4B are diagrammatic representations of the wire tensioning member providing for "overhead" and "pin" type gates in an electrified fence.
Figure 4B:
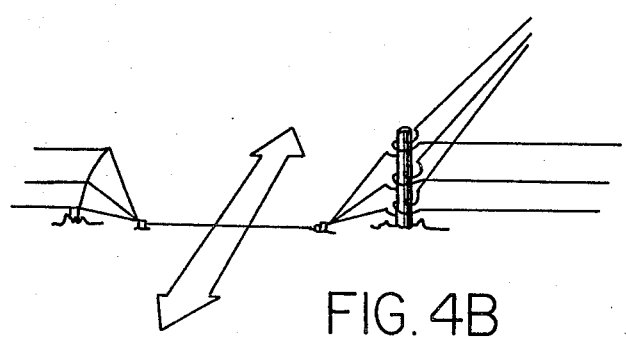

The wire tensioning member of the invention thus enables the fence wire(s) of a fence using the invention to be moved to provide something similar to a conventional gate as described. Furthermore an integral gate can be provided in the fence by raising the wires upwards to provide an "overhead gate" or a gap through which animals (e.g. sheep) can travel. Alternatively, the wires can be pinned to the ground ("pingate") in any position to allow stock (cattle) or vehicles to travel over the fence. These arrangements as shown respectively in FIGS. 4A and 4B are only possible with the use of the wire tensioning apparatus of the invention which enable the necessary extra tension to be applied to the wires without breakage.

Thus, by this invention there is provided an improved wire tensioning member which is capable of providing a spring tnesion in the fence wire, and which has other advantages in use as have been hereinbefore described in relation to methods of fencing, and in relation to the providing of advantageous features for electrified fencing, and gate type arrangements in electrified fencing systems.

Finally, it will be appreciated that the invention has been described by way of example only and that modifications, alterations and additions may be made to the invention without departing from the scope thereof.

I claim:

1. A wire tensioning member for providing a spring tension in a fence wire, comprising a spring steel member of a resiliently deformable compound curvature including a body portion having a generally elongate semi-elliptically curved shape, a first curved end portion extending from said generally elliptically curved body portion, a wire receiving aperture or recess in said first end portion, a wire receiving portion about which the wire may be wound adjacent to the end of said first curved end portion, a second end portion extending from said generally semi-elliptically curved body portion, an engaging portion on said second end portion adapted for removably engaging a fence member, and an insulating handle provided on said body portion, said engaging portion being an inwardly depending elongate engaging portion for removable and pivotable engagement of said wire tensioning member in a fixed support member and in its untensioned form is approximately aligned with an imaginary bisecting line of the semi-elliptical shape of the body portion which approximately bisects the medial portion of the curvature of the first curved end portion of said wire tensioning member.

2. A wire tensioning member as claimed in claim 1 wherein said body portion comprises a compound curvature as shown in FIG. 1.

3. A method of tensioning a light gauge fence wire comprising: providing a wire tensioning member of a resiliently deformable compound curvature having a body portion of a generally elongate semi-elliptically curved shape, a first curved end portion extending from said generally elliptically curved body portion including a wire receiving end portion having an aperture or recess therein, and a second end portion extending from said generally semi-elliptically curved body portion having an engaging means thereon; passing the free end of the wire through the aperture or recess in said first end portion; winding the wire about the wire receiving portion to adjust the length of the wire for the desired tension; and engaging the engaging means removably in a fixed support member.

4. In combination, a wire tensioning member for providing a spring tension in a fence wire, comprising: a spring steel member of a resiliently deformable compound curvature, a body portion of said member having a generally elongate semi-elliptically curved shape, a first-curved end portion extending from said generally elliptically curved body portion, a wire receiving aperture or recess in said first end portion and a wire receiving portion on said first end about which the wire may be wound adjacent to the end of said first end portion, and a second inwardly depending elongate engaging end portion extending from said generally semi-elliptically curved body portion; and an insulated plug member adapted for engagement in a recess provided in a fixed fence support member, a recess in said insulated plug member adapted to receive said inwardly depending elongate engaging portion of said wire tensioning member, and a peripheral flange on said plug member.

* * * * *